(12) United States Patent
Altun et al.

(10) Patent No.: US 12,723,959 B2
(45) Date of Patent: Sep. 1, 2026

(54) METHOD AND ASSEMBLY FOR MEASURING SOLID PRECIPITATION IN DRILLING FLUIDS

(71) Applicant: ISTANBUL TEKNIK UNIVERSITESI, Istanbul (TR)

(72) Inventors: Gursat Altun, Istanbul (TR); Muhammed Kemal Ozel, Istanbul (TR)

(73) Assignee: ISTANBUL TEKNIK UNIVERSITESI, Istanbul (TR)

( * ) Notice: Subject to any disclaimer, the term of this patent is extended or adjusted under 35 U.S.C. 154(b) by 321 days.

(21) Appl. No.: 18/575,371

(22) PCT Filed: Jun. 9, 2022

(86) PCT No.: PCT/TR2022/050572
§ 371 (c)(1),
(2) Date: Dec. 29, 2023

(87) PCT Pub. No.: WO2023/277843
PCT Pub. Date: Jan. 5, 2023

(65) Prior Publication Data

US 2024/0319060 A1 Sep. 26, 2024

(30) Foreign Application Priority Data

Jun. 30, 2021 (TR) ................................ 2021/010691

(51) Int. Cl.
*G01N 9/08* (2006.01)
*G01N 9/36* (2006.01)

(52) U.S. Cl.
CPC ................ *G01N 9/08* (2013.01); *G01N 9/36* (2013.01)

(58) Field of Classification Search
CPC ......... G01N 9/08; G01N 9/36; G01N 33/2823
(Continued)

(56) References Cited

U.S. PATENT DOCUMENTS 288,402 A * 11/1883 Borodoulin .............. G01N 9/18 73/454
808,421 A * 12/1905 Williams ................. G01N 9/08 73/451
(Continued)

FOREIGN PATENT DOCUMENTS

CN 207007642 U 2/2018
CN 208476721 U 2/2019
(Continued)

*Primary Examiner* — John Fitzgerald
(74) *Attorney, Agent, or Firm* — Bayramoglu Law Offices LLC

(57) ABSTRACT

A measurement method and a measuring assembly are provided, and the measuring assembly enables the measurement of the non-destructive and time-dependent change of solid precipitation in drilling fluid (mud) in static conditions. A measurement method and measuring assembly suitable for use in both in the laboratory and in the field, which is low cost and provides ease of application, has been developed. This method and assembly allow reliable temperature-dependent measurements of the change in the densities of drilling fluids of various densities, containing clays, some chemicals polymers and inert solids like barite ($BaSO_4$).

8 Claims, 4 Drawing Sheets

(58) Field of Classification Search
USPC .................................................... 73/433, 453
See application file for complete search history.

(56) References Cited

U.S. PATENT DOCUMENTS 1,257,662 A * 2/1918 Young ...................... G01N 9/16 73/437
2,094,768 A * 10/1937 Cruse ...................... G01N 9/14 73/449
2,550,031 A * 4/1951 Wraith, Jr. ............... G01N 9/18 73/452
2,972,255 A * 2/1961 Rachlin .................... G01N 9/12 366/141
3,071,971 A * 1/1963 Wallace ................... G01N 9/18 73/451
3,332,289 A * 7/1967 Weichselbaum ......... G01N 9/18 73/451
3,566,699 A * 3/1971 Dower ..................... G01N 9/10 73/452
3,754,446 A * 8/1973 O'Connor ................ G01N 9/18 73/309
3,782,199 A * 1/1974 Bell .................... G01F 23/0038 73/434
3,821,901 A * 7/1974 Fann ....................... G01G 3/06 73/437
3,908,466 A * 9/1975 Bell ......................... G01N 9/10 73/452
3,964,317 A * 6/1976 Blanchard ................ G01N 9/20 73/453
4,131,019 A * 12/1978 Krauss ..................... G01N 9/18 137/91
4,400,978 A * 8/1983 Guay ....................... G01N 9/20 73/453
5,410,914 A * 5/1995 Sasaki ...................... G01N 9/08 73/437
5,447,063 A * 9/1995 Glassey ................... G01N 9/22 73/437
5,471,873 A * 12/1995 Nyce ................... G01F 23/0038 73/32 A
5,744,716 A * 4/1998 Mimken .................. G01N 9/20 73/309
5,847,276 A * 12/1998 Mimken .................. G01N 9/20 73/309
6,026,683 A * 2/2000 Lee ..................... G01F 23/0038 73/309
6,240,770 B1 * 6/2001 Raffer ....................... B01L 7/00 73/54.23
6,408,694 B1 * 6/2002 Lin .......................... G01N 9/18 73/444
6,860,136 B1 * 3/2005 Hay, Jr. .................. G01G 19/00 73/437
7,082,827 B1 * 8/2006 Samuelson ......... G01F 23/0023 73/322.5
10,048,185 B2 * 8/2018 Wright ..................... G01N 9/10
11,319,806 B2 * 5/2022 Jackson .................. E21B 49/00
11,555,733 B2 * 1/2023 Beckett ............... G01F 23/0038
11,913,968 B2 * 2/2024 Porte ........................ G01N 9/18
12,174,169 B2 * 12/2024 Olivares Antunez ........................ G01N 33/2823
2001/0029782 A1 * 10/2001 Articolo .............. G01F 23/0038 73/314
2016/0252440 A1 * 9/2016 Wright ..................... G01N 9/02 73/32 R
2019/0316461 A1 10/2019 Cavanough
2021/0381369 A1 * 12/2021 Jackson .................. E21B 49/00
2022/0011211 A1 * 1/2022 Schuetz ............... G01N 11/162
2024/0319060 A1 * 9/2024 Altun ................. G01N 33/2823
2025/0277687 A1 * 9/2025 Alramadhan ........... G01F 23/04

FOREIGN PATENT DOCUMENTS

CN 111721670 A 9/2020
DE 10340555 B3 * 9/2004 ............... G01N 9/14
ES 2178976 A1 1/2003
GB 2365982 A * 2/2002 ............... G01N 9/20
JP S5613736 U 2/1981
JP H07103876 A 4/1995

* cited by examiner

METHOD AND ASSEMBLY FOR MEASURING SOLID PRECIPITATION IN DRILLING FLUIDS

CROSS-REFERENCE TO THE RELATED APPLICATIONS

This application is the national phase entry of International Application No. PCT/TR2022/050572, filed on Jun. 9, 2022, which is based upon and claims priority to Turkish Patent Application No. 2021/010691, filed on Jun. 30, 2021, the entire contents of which are incorporated herein by reference.

TECHNICAL FIELD

The present invention relates to a measurement method and assembly that enables time-dependent and non-destructive measurement of solid precipitation or sag or settlement in drilling fluids (suspension) in static conditions.

BACKGROUND

Drilling fluids are used to float and remove rock cuttings or fragments, cool the drill bit, lubricate the bit and drill string, and regulate the well hydrostatic pressure in drilling applications. The well hydrostatic pressure must be maintained above the formation pressure to prevent possible fluid influx from the formation and below the formation fracture pressure to minimize formation damage. It is necessary to regulate the density of the drilling fluid by using the solids (low-density and high-density materials) suspended in the drilling fluid. It is essential to monitor the possible changes in density or to determine the change tendency in advance since the solids used in the drilling fluid formulation tend to precipitate.

Various solutions for measuring the density of drilling fluids are known in the art. Solutions utilizing acoustic, laser and nuclear magnetic resonance are examples. However, these solutions do not provide non-destructive measurement and require expensive equipment and expertizing.

In the document numbered U.S. Pat. No. 3,782,199A, a device for measuring circulating fluid or sludge density is disclosed. The assembly comprises a weight immersed in the sludge passing through a tank on the circulation line and allows monitoring of the sludge density depending on the buoyant force. Flow guiding elements are also described so that the weight is not affected by the movement of the sludge. In the document numbered U.S. Pat. No. 2,972, 255A, a device for monitoring the specific gravity of fluid by means of lifting force in a tank located on the circulation line is also disclosed. Since the devices mentioned above are designed for measurements in dynamic conditions, some other phenomena like centrifugal force, as a result of assembly structure, may affect the precipitation severity and measurement accuracy. Moreover, usage of these in drilling rig systems may cause misleading results since some other incidents can cause density alteration like the entrance of formation fluids (both liquid and gas).

In the document numbered US2019316461A1, a device for measuring the depth of a well containing a liquid is disclosed. It has been disclosed that weight with a relatively smooth surface is used in the assembly.

In document numbered CN208476721U, a floating device for monitoring the density of drilling fluid flowing in mud line, using change at potentiometer value of the circuit loop, accommodated on the device, as a result of vertical movement (up and down) of the device.

Apart from the solutions mentioned above regarding the drilling fluid, some other solutions for concentration measurement are also included in the art. Document JPS5613736U discloses a system for monitoring a mixture of solid and liquid fuel in the tank. The system contains more than one weight at different depths, which allows the concentration to change due to the precipitation of the solid component and the concentration distribution according to the depth. In document JPH07103876A, a method for determining the dispersibility and precipitation tendency of a suspension containing photosensitive material, which is used to produce a fluorescent film, in which the forces exerted on a weight immersed in the suspension are measured over time is disclosed. However, the systems and methods described in these documents cannot be applied to the measurements on drilling fluids containing solid particles consisting of clays such as bentonite and some polymers together with weighting materials such as API barite.

SUMMARY

The object of the present invention is to develop a measurement method and assembly that enables the measurement of density variation of drilling fluid in static conditions due to the precipitation of the solids (weighting material) within it. The invention allows determining the time-dependent change of the density of drilling fluid and predicting its behavior non-destructively in the well.

A further object of the invention is to develop a measuring assembly that allows the precipitation to be measured at temperatures representing the in-situ well conditions.

With the invention, density change measurements of drilling fluids of various densities, containing clays such as bentonite, some chemicals and polymers, and inert solid (weighting material such as API barite ($BaSO_4$)) can be carried out under static conditions.

For the objects of the invention, a measurement method has been developed that enables the time-dependent calculation of the density variation by measuring the time-dependent change of the buoyant force acting on a probe suspended in a drilling fluid containing solid particles. The measurement method of the invention also allows the calculation of the instantaneous density by instantaneously measuring the effective weight change of the probe immersed in the drilling fluid. The relationship between the change of the measured force (effective probe weight) and the precipitation of the solid particles can be modeled since the change of the measured force is the result of the change of the buoyant force due to the precipitation of the solid particles in the drilling fluid.

A measurement setup has also been developed to apply this measurement method. The said measuring assembly also comprises a heat jacket surrounding a fluid chamber that holds the drilling fluid sample at a temperature corresponding to the in-situ borehole condition.

The measuring assembly includes an ellipsoid-shaped probe whose long axis extends vertically in order to prevent the accumulation of solid particles on the probe, which causes measurement errors. The probe is made of a material with a suitable geometric shape to minimize the surface area where solid particles can adhere. A coating is applied to the surface of the probe to prevent the adhesion of solid particles. The probe is made of a high-density material, for example, lead, to sink in the drilling fluid and prevent vertical oscillation.

BRIEF DESCRIPTION OF THE DRAWINGS

The measuring assembly for achieving the objects of the present invention is shown in the accompanying figures.

The parts in the figures are individually numbered, and their corresponding numbers are given below.

Figure 1:
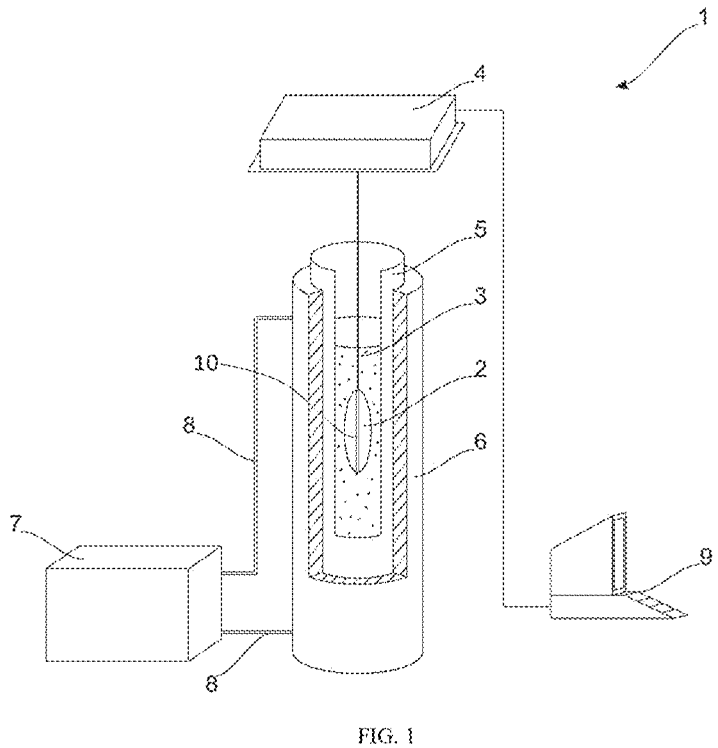
FIG. 1 is a schematic view of a measuring apparatus according to the invention.

1. Measuring assembly
2. Probe
3. Hanger
4. Precision balance
5. Fluid chamber
6. Heat jacket
7. Heat bath
8. Pipe
9. Computer
10. Cylindrical channel

DETAILED DESCRIPTION OF THE EMBODIMENTS

The measurement method of the invention, basically, comprises the steps of

- taking the drilling fluid sample into a fluid chamber (5),
- suspending a probe (2), the weight of which is known and the density of which is above the maximum density that the drilling fluid can have, to the drilling fluid using a hanger (3),
- keeping the drilling fluid in the static state,
- measuring the time-dependent effective weight of the probe (2) immersed into the drilling fluid,
- calculating the instantaneous drilling fluid density employing the buoyancy (Archimedes' principle) using the measured force (effective weight of probe) or the change of the drilling fluid density utilizing the change of the measured force (time-dependent effective weight of probe).

The probe (2) is suspended so that it is completely submerged in the drilling fluid and does not touch the base of the fluid chamber (5). The density of drilling fluid can be expressed in the form of the core mass (probe) or preferably the corresponding specific gravity.

Measured force, which can also be called effective weight, can be expressed as follows:

$$W_e = W - F_{Bo}$$

Here, W shows the magnitude of the weight of the probe (2) in the air; $F_{Bo}$ shows the magnitude of the buoyant force. The buoyant force also depends on the density of the drilling fluid (on) and the volume of the probe (2) (V). The volume of the probe (2) can also be written in terms of the relevant weight (W) and density of the probe ($\rho_p$). Thus, the buoyant force can be expressed as follows:

$$F_{Bo} = \rho_{fl} \cdot V = \rho_{fl} \cdot \frac{W}{\rho_p}$$

Effective weight, in this case, is expressed as follows:

$$W_e = W\left(1 - \frac{\rho_{fl}}{\rho_p}\right)$$

Similarly, the time-dependent change of effective weight ($\Delta W_e$) as a result of the precipitation of solid particles can also be expressed as:

$$\Delta W_e = W\left(1 - \frac{\Delta\rho_{fl}}{\rho_p}\right)$$

Hence, the density changes of the drilling fluid ($\Delta\rho_{fl}$) can be found according to the following expression using the measured effective weight variation:

$$\Delta\rho_{fl} = \rho_p \cdot \left(1 - \frac{\Delta W_e}{W}\right)$$

The density of the fluid ($\rho_{flt}$) at any time (t) can also be found from the following expression:

$$\rho_{flt} = \rho_p \cdot \left(1 - \frac{W_e}{W}\right)_t$$

In the preferred embodiment of the invention, the temperature of the sample is also regulated during the measurement so that the drilling fluid behavior can be examined under conditions similar to the wellbore or borehole.

With the measurement method of the invention, measurement at one or more depths can be taken from the drilling fluid sample.

The measurement setup (1) developed for the application of the measurement method comprises the following:

- a fluid chamber (5) holding the drilling fluid sample,
- a probe (2), the weight of which is known and the density of which is above the maximum density that the drilling fluid can have,
- a hanger (3) having a length that holds the probe (2) in the fluid chamber (5) so that it is completely embedded in the drilling fluid and does not contact the base of the fluid chamber (5),
- a precision balance (4), to which the hanger (3) is attached, allows for measurement of the net force caused by the self-weight of the probe (2) and the buoyant force generated by the drilling fluid.

The hanger (3) may be a wire or line connected to the precision balance (4) at one end or a solid arm. The hanger (3) is preferably selected such that its weight and horizontal cross-sectional area are too small with respect to the probe (2) to minimize the impact on the measurement results.

The drilling fluid sample taken into the fluid chamber (5) may be a sample prepared for trial purposes before its usage in a borehole or a sample taken from a drilling fluid circulation system. The measuring assembly (1) of the invention also includes a heat jacket (6) that surrounds the fluid chamber (5) from the sides and ensures that the sample is kept at a specific temperature so that the drilling fluid behavior can be examined under conditions similar to the wellbore. The heat jacket (6) may be in a structure containing an annular space around the fluid chamber (5) in which a heating fluid circulates, and the desired temperature conditions are ensured therewith. This fluid can be supplied by a heat bath (7) via pipes (8) connected to the heat jacket (6).

The precision balance (4) is connected to a computer for obtaining, storing, and performing calculations of the measurement results. In addition to the precision balance (4), the heat bath (7) can also be connected to the computer to regulate the temperature. These connections can be established wired or wirelessly via an external or internal card.

The fluid chamber (5) and the heat jacket (6) may be made of transparent materials for the drilling fluid and the probe (2) to be observed visually. The fluid chamber (5) is preferably in the form of a cylinder.

The probe (2) is in the form of an ellipsoid whose vertical axis is longer than its horizontal axes. Thus, solid particles such as barite or barite along with bentonite and solid polymers accumulating on the probe (2) during measurement can be prevented, and the known mass value of probe (2) is preserved. In the invention's preferred embodiment, the ratio of each horizontal axis length of the probe (2) to the vertical axis length is between 0.3 to 0.4. The hanger (3) is connected to the probe (2) by a cylindrical channel (10) extending along the vertical axis of the probe (2).

A coating paint was also applied to the surface of the probe (2) in order to prevent the accumulation of solid particles on the probe (2). The ratio of the horizontal axis length of the probe (2) to the diameter of the cylindrical fluid chamber (5) is less than 0.3 so that solid particles accumulation on the probe (2) is prevented and the probe (2) does not influence the precipitation tendency of the drilling fluid.

In an exemplary embodiment of the invention, a cylindrical fluid chamber (5) with a diameter of 67 mm and an ellipsoid-shaped probe (2) with a vertical axis of 41.82 mm and horizontal axes of 13.72 mm (in a circular shape) is used. The probe (2) is positioned by means of the hanger (3) so that it is two-thirds above the depth of the drilling fluid sample from the base of the fluid chamber (5).

An experiment was also carried out with an exemplary KCl-polymer drilling fluid to demonstrate the efficacy of the invention. 350 ml of distilled water was placed in a mixer chamber in accordance with API (American Petroleum Institute) standards for the preparation of drilling fluid. 25 g potassium chloride (KCl), 1 g polyacrylamide (PHPA), 4 g polyanionic cellulose (PAC-LV), 0.25 g xanthan gum, 0.1 g sodium hydroxide (NaOH), 100 g sodium chloride (NaCl) and 524 g barite ($BaSO_4$) were added respectively. At the same time, the purified water was mixed in the chamber. The drilling fluid was stirred for 5 minutes after adding each substance.

According to the invention, the solid precipitation test in the drilling fluid was carried out with the measuring assembly (1). The initial weight of the probe in the air was measured as 37.80 g (W) and its initial effective weight as 31.09 g ($W_{ei}$). The measured initial fluid density ($\rho_{fli}$) was determined as 15.97 lbm/gal (1917 kg/m$^3$), the initial theoretical fluid density ($\Sigma_{fli.teo}$) was determined as 15.96 lbm/gal (1916 kg/m$^3$), and the initial barite ratio ($w_{bi}$ %) in suspension was determined as 52.17% by weight. The results obtained are given in the following equation.

$$\rho_{fli} = \rho_p \cdot \left(1 - \frac{W_{ei}}{W}\right) = 10.80 \frac{\text{g}}{\text{cm}^3} \cdot \left(1 - \frac{31.09\ \text{g}}{37.80\ \text{g}}\right) = 1.917 \frac{\text{g}}{\text{cm}^3} = 15.97 \frac{\text{lbm}}{\text{gal}}$$

$$\rho_{fli.teo} = \frac{\sum m}{\sum V} = \frac{m_{barite} + m_{KCl} + m_{NaCl} + m_{water} + m_{other}}{V_{barite} + V_{su+NaCl+KCl} + V_{other}}$$

$$\rho_{fli.teo} = \frac{(524 + 25 + 100 + 350 + 5.35)\ \text{g}}{(124.76 + 396.82 + 2.66)\ \text{cm}^3} = 1.916 \frac{\text{g}}{\text{cm}^3} = 15.96 \frac{\text{lbm}}{\text{gal}}$$

$$w_{bi}\ \% = \frac{\sum m_b}{\sum m} = \frac{524\ \text{g}}{(524 + 25 + 100 + 350 + 5.35)\ \text{g}} = 52.17\%$$

Figure 2:
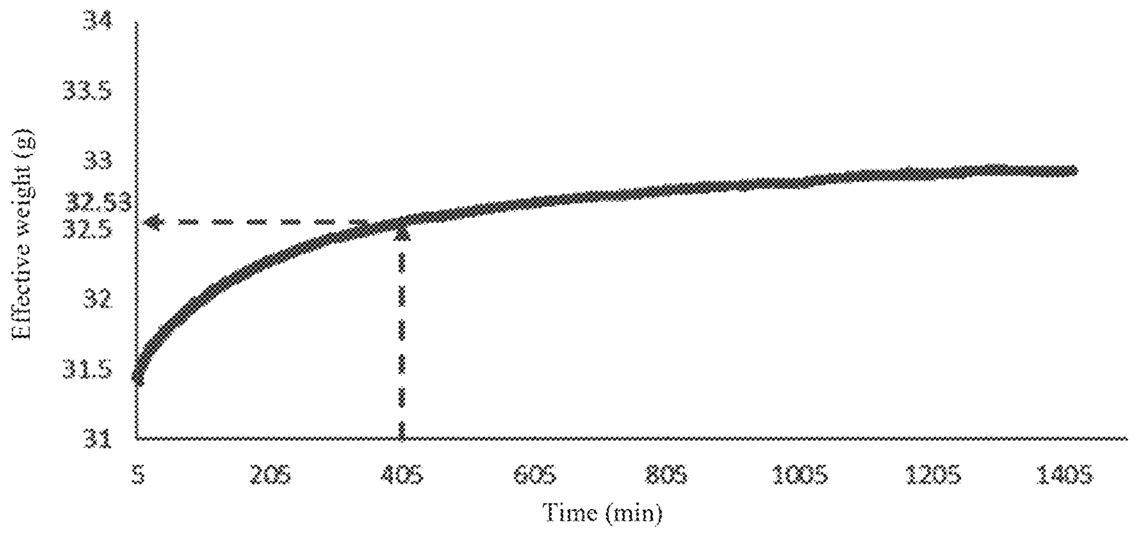
FIG. 2 is a graph showing the change of the effective weight measured according to the invention with respect to time.
Figure 3:
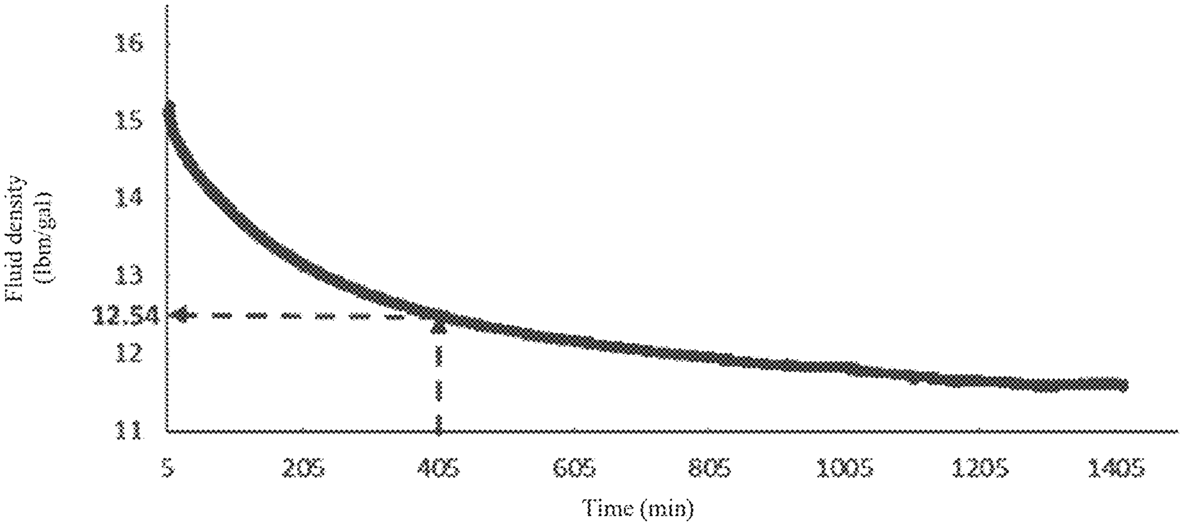
FIG. 3 is a graph showing the time-dependent change of the fluid density calculated according to the invention.

Initially, the effective weight ($W_{ei}$) measured as 31.09 g was measured as 32.53 g (FIG. 2) after 405 minutes. After 405 minutes, the drilling fluid density was determined as 12.54 lbm/gal (1505 kg/m$^3$) (FIG. 3).

$$\rho_{fl@405} = \rho_p \cdot \left(1 - \frac{W_e}{W}\right) = 10.80 \frac{\text{g}}{\text{cm}^3} \cdot \left(1 - \frac{32.53\ \text{g}}{37.80\ \text{g}}\right) = 1.505 \frac{\text{g}}{\text{cm}^3} = 12.54 \frac{\text{lbm}}{\text{gal}}$$

Figure 4:
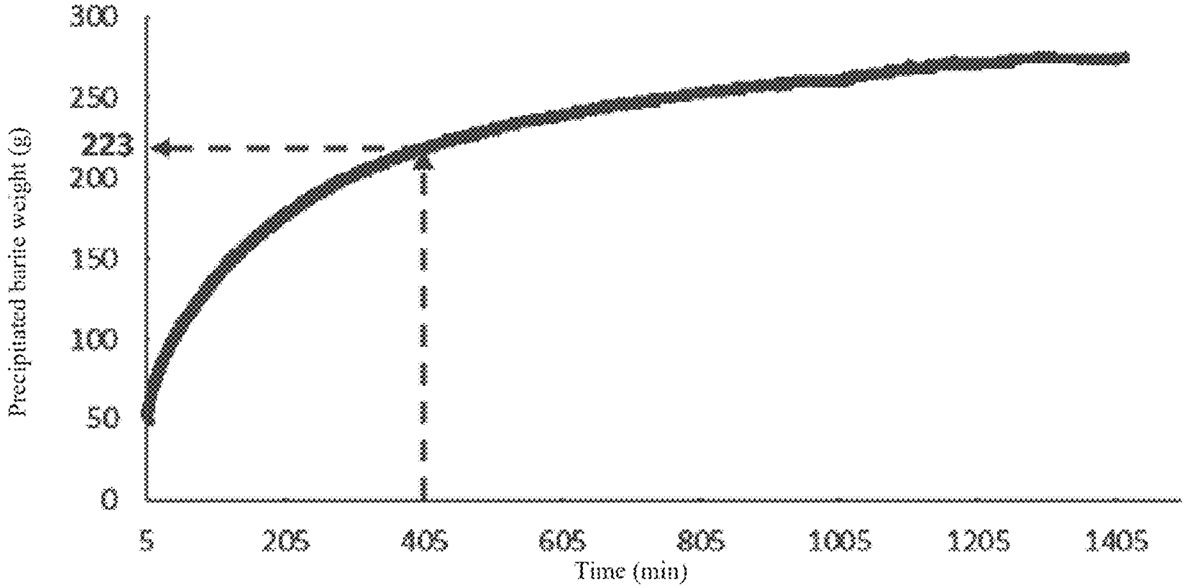
FIG. 4 is a graph showing the change of the total amount of weighting material (API barite) precipitation calculated according to the invention with respect to time.

While the barite content in the suspension was 52.17% by weight at the beginning, the total amount of barite deposited after 405 minutes was calculated as 223 g. The amount of barite in the suspension with a density of 12.54 lbm/gal (1505 kg/m$^3$) was calculated as 38.52% by weight (FIG. 4). At the end of 405 minutes, the barite ratio by weight is given in the following equation.

$$w_{b@405}\ \% = \frac{m_b}{\sum m} = \frac{(524 - 223)\ \text{g}}{[(524 - 223) + 25 + 100 + 350 + 5.35]\ \text{g}} = 38.52\%$$

The measurement method and the measuring assembly (1), which are the subject of the invention, pave the way for performing non-destructive measurements and ensure that the density change in the drilling fluid and the solid precipitation can be determined reliably and precisely, as shown in the experimental results.

What is claimed is:

1. A measurement method for non-destructive and time-dependent measurement of solid precipitation of drilling fluid, comprising mud, in static conditions, wherein the measurement method comprises the steps of i) taking a drilling fluid sample into a fluid chamber, ii) suspending a probe to the drilling fluid by means of a hanger, wherein the probe is completely embedded in the drilling fluid and does not contact a base of the fluid chamber, wherein a weight of the probe is known and a density of the probe is above a maximum density that the drilling fluid is allowed to have, iii) keeping the drilling fluid in the static state, iv) measuring a sum of a weight acting on the probe and a buoyant force caused by the drilling fluid during holding of the drilling fluid, and v) calculating an instantaneous drilling fluid density using the measured force or a change of a drilling fluid density using a change of the measured force.

2. The measurement method according to claim 1, wherein change of the drilling fluid density ($\Delta\rho_{fl}$) is calculated according to the equation $$\Delta\rho_{fl} = \rho_p \cdot \left(1 - \frac{\Delta W_e}{W}\right)$$

by using the density of the probe ($\rho_p$), the weight of the probe in the air (W) and the change of the measured force ($\Delta W_e$).

3. The measurement method, according to claim 1, wherein the drilling fluid density ($\rho_{flt}$) at the time (t) is calculated according to the equation $$\rho_{flt} = \rho_p \cdot \left(1 - \frac{W_e}{W}\right)_t$$

by using the density of the probe ($\rho_p$), the weight of the probe in the air (W) and the force ($W_e$) measured at the time (t).

4. The measurement method, according to claim 1, wherein a temperature of the drilling fluid sample is further regulated during measurement.

5. A measuring assembly for measuring solid precipitation of drilling fluid, comprising mud, in static conditions, comprising:

a fluid chamber holding a drilling fluid sample;

a probe, wherein a weight of the probe is known and a density of the probe is above a maximum density that the drilling fluid is allowed to have, wherein the probe is in a form of an ellipsoid, and wherein vertical axis of the ellipsoid is longer than horizontal axes of the ellipsoid;

a hanger, wherein the hanger has a length to hold the probe in the fluid chamber, wherein the probe is completely embedded in the drilling fluid and does not contact abase of the fluid chamber, wherein the hanger is connected to the probe by a cylindrical channel extending along the vertical axis of the probe;

a precision balance, wherein the hanger is connected to the precision balance, the precision balance allows measurement of a sum of a weight acting on the probe and a buoyant force caused by the drilling fluid.

6. The measuring assembly according to claim 5, wherein the probe has a ratio of each horizontal axis length (in a circular shape) to a vertical axis length between 0.3 and 0.4.

7. The measuring assembly according to claim 5, wherein the probe has a ratio of horizontal axis length to a diameter of the cylindrical fluid chamber less than 0.3.

8. The measuring assembly according to claim 5, comprising a heat jacket, wherein the heat jacket surrounds the fluid chamber from sides and keeps the fluid chamber at a predetermined temperature.

* * * * *